V. P. McVOY.
AIR BRAKE COUPLING ATTACHMENT.
APPLICATION FILED NOV. 20, 1919.

1,359,408.

Patented Nov. 16, 1920.

Witness

Inventor
Vincent P. McVoy

By E. H. Bond
Attorney

UNITED STATES PATENT OFFICE.

VINCEN P. McVOY, OF MOBILE, ALABAMA, ASSIGNOR TO UNITED STATES RAILWAY SUPPLY COMPANY, OF DOVER, DELAWARE, A CORPORATION OF DELAWARE.

AIR-BRAKE COUPLING ATTACHMENT.

1,359,408.  Specification of Letters Patent.  Patented Nov. 16, 1920.

Application filed November 20, 1919. Serial No. 339,524.

*To all whom it may concern:*

Be it known that I, VINCEN P. McVOY, a citizen of the United States, residing at Mobile, in the county of Mobile and State of Alabama, have invented certain new and useful Improvements in Air-Brake Coupling Attachments, of which the following is a specification.

This invention relates to certain new and useful devices applicable to the hose couplings of the brake systems of railway trains.

The present invention has for its objects among others to provide simple, yet efficient and reliable means, readily applied to the couplings now in use, for the purpose of quickly and easily exhausting the air from the couplings when it is desired to uncouple the same.

As is well-known, when it is desired to uncouple the couplings between two lines of hose connecting two adjacent cars, the valves upon each side of the couplings are generally closed, leaving the couplings full of compressed air similar to that in the train-line and this renders it difficult to uncouple, making it necessary to employ both hands, and at best is not an easy matter. My present invention embodies means operable by one hand, without the necessity of going under the car, by which the air is quickly exhausted so that the coupling members can be easily and quickly separated.

The device constituting the present improvement is composed of few parts, those readily assembled, easily operated, and not liable to become injured or get out of order. Being easily operable by one hand without going under the car, the operator has his other hand free to support himself upon the hand-rail or other portion of the car so that even should the train start while he is attempting to uncouple he is not in danger of being injured in any way.

Other objects and advantages of the invention will hereinafter appear and the novel features thereof will be particularly pointed out in the appended claims.

The invention, in its preferred form, is clearly illustrated in the accompanying drawing, which, with the numerals of reference marked thereon, form a part of this specification, and in which—

Like numerals of reference indicate like parts throughout the different views.

Figure 1:
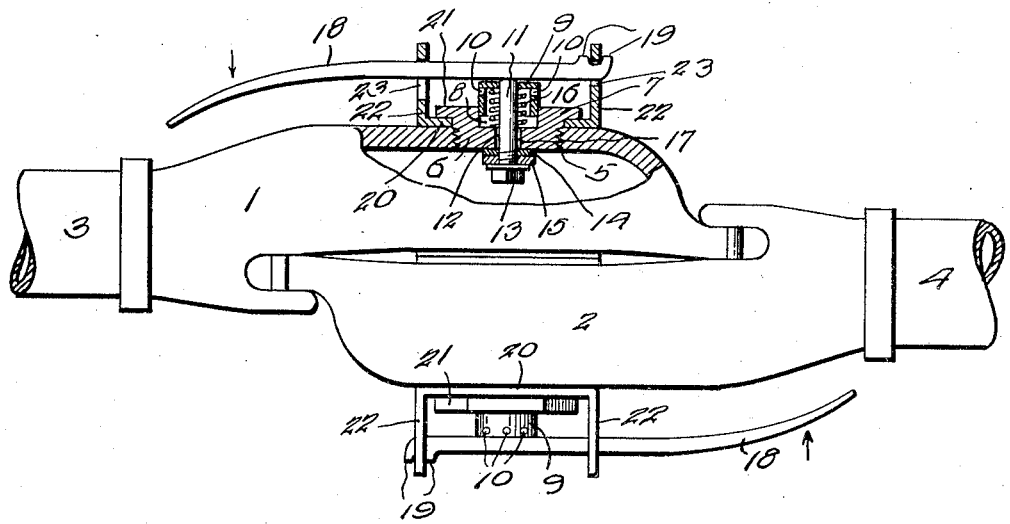
Figure 1 is a side elevation of two coupling members in coupled position, provided with my improvement, the upper portion being broken away with parts shown in section.

Referring to the drawings, 1 and 2 designate the coupling members of well-known or any approved form of construction and 3 and 4 the adjacent portions of the hose-attaching portion.

In applying my present improvement, I form in the coupling member a screw-threaded opening 5 into which is threaded the screw-threaded portion 6 of the plug or bushing 7. This bushing is counterbored to form a chamber 8 and fitted to slide within this chamber is a thimble or cap 9 having near its outer end the radial openings 10. Secured to and movable with this cap 9 is a stem 11 slidable loosely through an opening 12 in the portion 6 and provided at its inner end with a nut 13, there being shown as interposed between the nut and the adjacent face of the member 6 a washer 14 of rubber or analogous material against which bears the metal washer 15 for an obvious purpose.

16 is a spring surrounding the stem 11 and disposed within the chamber 8, finding a bearing at one end against the bottom of the chamber and at the other end against the outer end of the cap. The stem may be of sufficiently smaller diameter or cross section than the bore or opening through which it works to provide a passageway 17 for the air, as seen in Fig. 1. The stem may be polygonal or of other form to provide such passageway.

Figure 2:
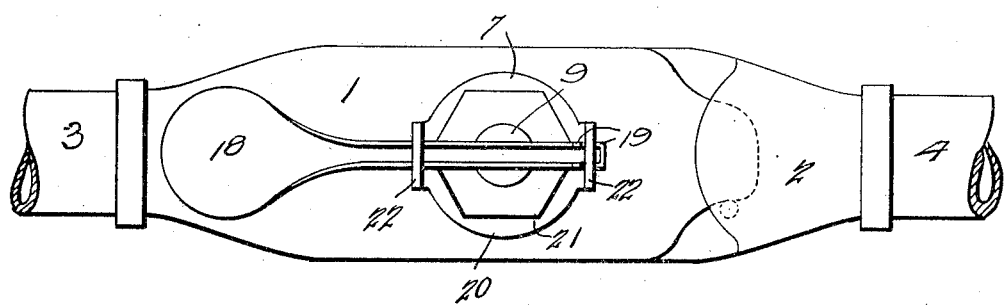
Fig. 2 is a top plan.

18 is the lever or member by which the stem is moved inward. It is preferably, though not necessarily, of the channel iron form seen in Fig. 2, being provided at one end with a pair of lips 19. 20 is a plate resting against the outer face of the coupling member and having an opening through which the threaded portion 6 of the plug or bushing passes, the flange 21 of the plug or bushing resting upon the body portion of the member 20. Rising from diametrically opposite sides of the member 20 are the ears or the like 22 having slots 23 through which the operating lever or member 18 passes.

In practice, this member is inserted endwise through these slots 23 and the ears 19 engage with the upper portion of one of the slots, as seen in Fig. 1, when these ears or lugs serve to prevent accidental displacement of the lever. Normally, the spring 16 tends to force the cap 9 outward and press the washer 14 firmly against the inner wall of the member 6 so as to tightly close the opening or passageway 17. When it is desired to uncouple, all that it is necessary to do is for the trainman to press upon the lever 18 in the direction of the arrow which will compress the spring, the stem 11 with its cap being moved inward, with the result that the washer 14 is also moved inward, thus permitting the ready escape of the air through the passage 17 and out through the openings 10 in the cap to the atmosphere, and allowing of ready uncoupling of the coupling members. When pressure is removed from the member 18, the spring returns the parts to normal position ready for further use.

It will be noted that the construction is such that should, perchance, the spring become broken, the device will still be operative, as the pressure from within the coupling would be sufficient to seat the washer 14 so as to close the opening 17 and prevent leakage through said opening.

What is claimed as new is:—

1. An attachment for a train-pipe coupling embodying a bushing insertible in an opening in the coupling member and means removable with said bushing closable by the pressure within the coupling, and lever means for actuating the same to exhaust the air from said coupling accessible from the side of the coupling member.

2. A train-pipe coupling exhaust mechanism comprising a member attachable to and insertible in an opening in the coupling, a movable closure for an opening in said member, and lever means for moving the said closure to permit of the escape of air accessible from the side of the coupling member.

3. A train-pipe coupling attachment comprising a member insertible in an opening in the coupling, an apertured cap movable in said member, a stem movable with the cap and carrying means for closing a passage through said member, and means for exerting pressure on said cap to permit of the escape of air from the coupling.

4. A device for the purpose described comprising a plug insertible in an opening in a train-pipe coupling, a stem movable through said plug and carrying a closure, means coöperating with the pressure within the coupling for normally seating the closure, and lever means contacting with said stem for moving the closure away from its seat.

5. A device for the purpose described comprising a plug having a chamber and a passage, a stem movable through said passage and carrying a closure for said passage, an apertured cap movable with the stem, and means for applying pressure to the cap in opposition to the tendency of the air within the coupling to force said cap outward.

6. A device for the purpose described, comprising a plug having an opening therethrough, a cap movable in the plug, a closure for said opening, movable with the cap, a spring in said cap tending to move the cap outward, and means for moving the cap and closure simultaneously in opposition to said spring.

7. A device for the purpose described, comprising a chambered flanged plug with an opening therethrough, a stem movable through said opening, a closure for the opening carried by the stem, an apertured cap movable in said chamber and with said stem, a spring tending to force the cap outward, means retained by the flange of the plug for supporting a pressure device, and a pressure device supported thereby and engageable with said cap to move the same against the action of the spring.

In testimony whereof I affix my signature.

VINCEN P. McVOY.